United States Patent [19]

Bullivant

[11] 4,089,407
[45] May 16, 1978

[54] CONSTANT BELT TENSIONER
[75] Inventor: Kenneth W. Bullivant, Millville, N.J.
[73] Assignee: K-tron Corporation, Glassboro, N.J.
[21] Appl. No.: 764,105
[22] Filed: Jan. 31, 1977
[51] Int. Cl.² .......................................... B65G 23/44
[52] U.S. Cl. .................................................. 198/815
[58] Field of Search ........................ 198/813, 815, 499; 280/757, 758, 759; 212/48, 49

[56] References Cited

U.S. PATENT DOCUMENTS

| 2,371,747 | 3/1945 | Faris et al. | 198/815 X |
| 3,078,983 | 2/1963 | Philips | 198/815 |
| 3,370,693 | 2/1968 | Marsden | 198/815 X |
| 3,679,010 | 7/1972 | Bullivant | 198/505 X |
| 3,952,863 | 4/1976 | Schattauer | 198/499 |

FOREIGN PATENT DOCUMENTS

| 1,092,374 | 11/1960 | Germany | 198/815 |
| 1,092,834 | 11/1960 | Germany | 198/815 |

Primary Examiner—John J. Love
Assistant Examiner—James L. Rowland
Attorney, Agent, or Firm—Seidel, Gonda & Goldhammer

[57] ABSTRACT

Apparatus is provided for applying a constant tension to a belt extending around first and second rollers by way of a parallelogram linkage connected to said second roller for moving said second roller to tension said belt. A lever arm is connected to the linkage and includes a weight adjustable along the lever arm.

5 Claims, 3 Drawing Figures

CONSTANT BELT TENSIONER

BACKGROUND

A wide variety of belt tensioners are disclosed in the prior art classified in Class 198. Gravometric feeders such as the feeder disclosed in U.S. Pat. No. 3,679,010 require a constant belt tensioner since a change in belt tension will create an error when weighing flowable masses on the belt.

The present invention satisfies a long sought after need in the art, namely a simple inexpensive constant belt tensioner which is reliable and is arranged in a manner so as to magnify or multiply the tensioning force. Such magnification or multiplication, for example, is not obtained where a weight is applied through a simple pulley.

SUMMARY OF THE INVENTION

The present invention is directed to a constant belt tensioner of the type wherein an endless belt extends around first and second rollers. A parallelogram linkage is connected to one of the rollers such as the second roller for moving the second roller in a direction for applying tension to the belt. A lever arm has one portion fixedly connected to the linkage for biasing the linkage in said direction. A weight is connected to another portion of the lever arm.

It is an object of the present invention to provide a novel constant belt tensioner which is simple, reliable, inexpensive and which provides for multiplication of the applied force.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a perspective view of the parallelogram linkage support for the belt roller and the lever arm bias thereon.

Referring to the drawing in detail, where like numerals indicate like elements, there is shown a gravometric feeder designated generally as 10 for the purposes of illustrating an environment in which the constant belt tensioner apparatus of the present invention is utilized.

Figure 1:
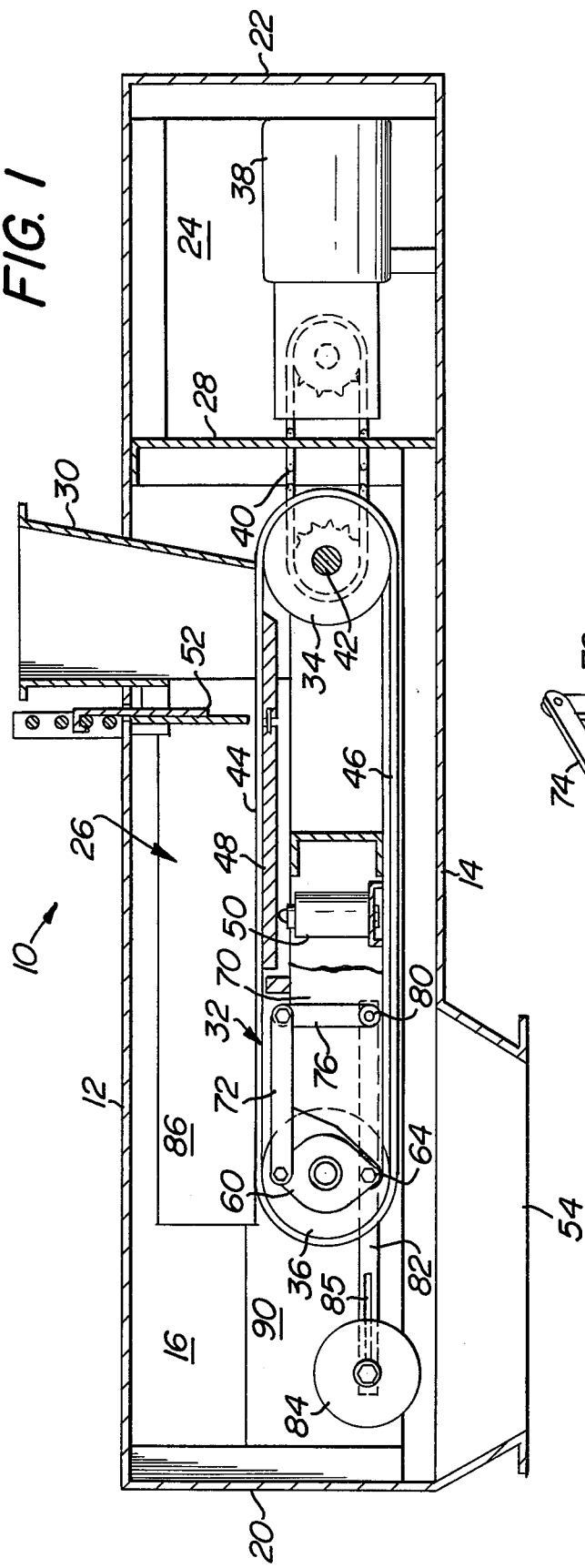
FIG. 1 is a sectional view through a gravometric feeder incorporating the constant belt tensioner of the present invention.
Figure 2:
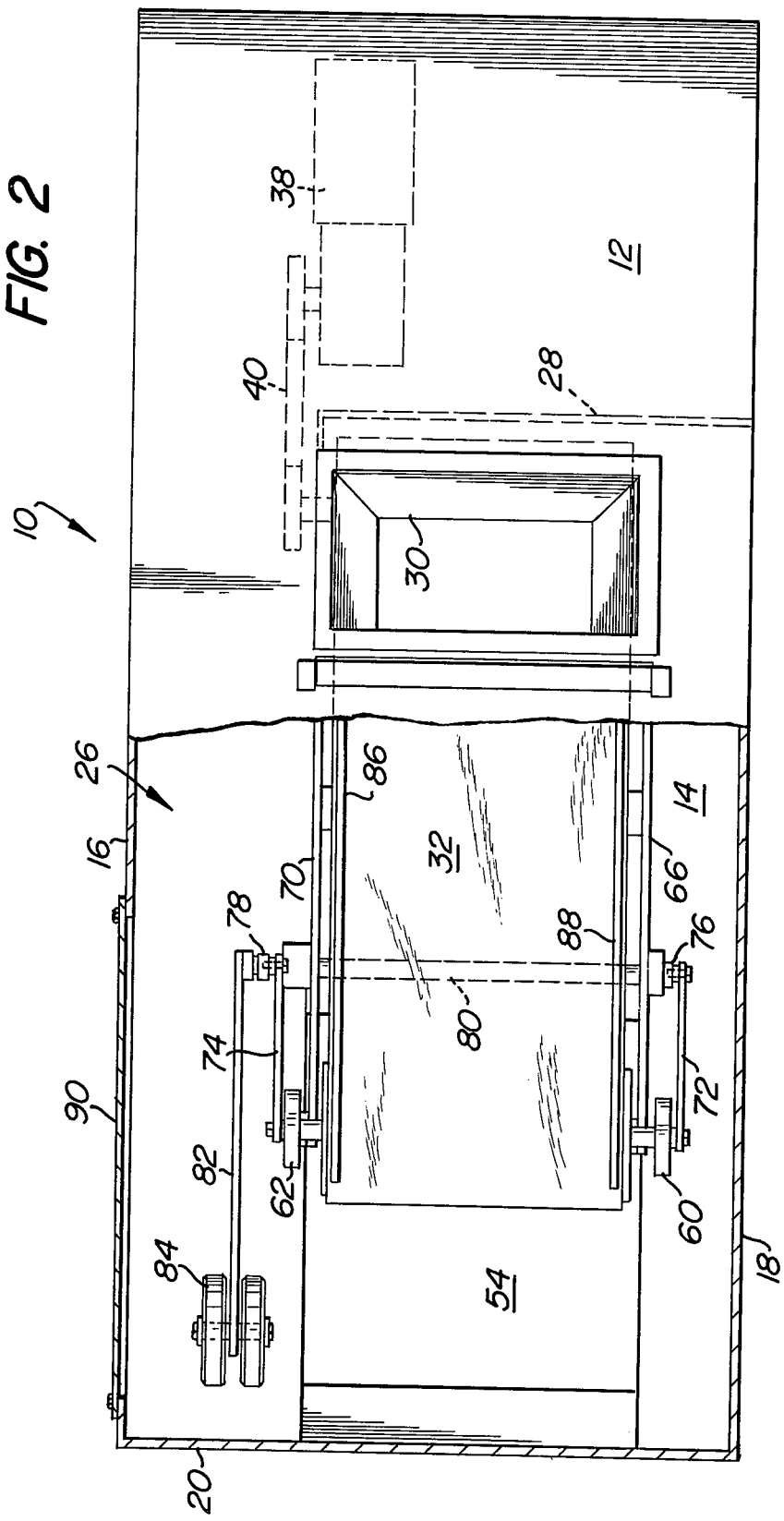
FIG. 2 is a top plan view of the feeder shown in FIG. 1 with portions broken away for purposes of illustration.

The feeder 10 includes a housing defined by top wall 12, bottom wall 14, side walls 16 and 18 and end walls 20, 22. The housing is divided into a motor chamber 24, isolated from belt chamber 26 by way of partitioning 28.

The top wall 12 supports a hopper having its lower end terminating at, or immediately adjacent to, the top run 44 of endless belt 32. Endless belt 32 extends around a first roller 34 and a second roller 36. Roller 34 has a shaft 42 on which is mounted a sprocket. The sprocket meshes with chain 40. Chain 40 extends around a mating sprocket at the output end of a motor 38. Motor 38 is disposed in the chamber 24. Thus, roller 34 is a drive roller coupled to the drive motor 38.

Between the top run 44 and the bottom 46 of the belt 32, there is provided a weighing plate 48. One end of plate 48 is pivotably supported by the frame housing. The other end of the plate 48 is supported by a load cell 50. Flowable granular material introduced onto the belt 32 by way of hopper 30 is controlled as to the height thereof by way of valve member 52. The granular material is weighed while on the top run of the belt 32 before it is discharged through the chute 54.

The roller 36 is provided with stub shafts 58 rotatably supported by bearing housings 60 and 62. One end of bearing housing 62 is pivotably supported at pin 64 by the frame wall 66. The bearing housing 62 is pivotably supported by the frame wall 70 at pin 68. Thus, the bearing housings 60, 62 and the roller 36 rotatably supported thereby may pivot about the longitudinal axis of pins 64, 68 which is parallel to the longitudinal axis of roller 36. The bearing housings 60, 62 are of the same length and are part of a parallelogram linkage for moving the roller 36 to maintain a constant tension of belt 32. The parallelogram linkage includes parallel links 72, 74 of the same length and parallel levers 76, 78. Each of levers 76, 78 has an effective length equal to the effective length of bearing housings 60, 62. The link 72 is pivotably coupled at one end to the upper end of bearing housing 60 and pivotably coupled at its other end to the upper end of lever 76. The link 74 is similarly coupled to the bearing housing 62 and lever 78.

The lower ends of the levers 76, 78 are fixedly secured to a shaft 80 rotatably supported by said walls 66, 70. The distance between a shaft 80 and aligned pins 64, 68 corresponds to the effective length of the links 72, 74. As shown in FIG. 1, the levers 76, 78 are vertically disposed and perpendicular to the longitudinal axis of shaft 80 while being parallel to the bearing housings 60, 62.

One end of a lever arm 82 is fixedly secured to shaft 80. A weight 84 is adjustably coupled to the lever arm 82 for adjustment therealong in any convenient manner. As illustrated, the adjustment of weight 84 is obtained by adjustment of a threaded bolt which extends through a slot 85 in the lever arm 82. Access to weight 84 is attained by removing panel 90.

Side plates 86 and 88 are supported by the frame housing along opposite sides of the top run 44 of the belt 32. The side plates 86, 88 confine the grain of the material to the top run 44 of belt 32 particularly in the area of the plate 48.

The feeder 10 operates as described in the above-mentioned patent insofar as its weighing function is concerned. When the belt 32 changes due to stretching or the like, tension in the belt 32 is automatically maintained by the biasing force of the parallelogram linkage connected to the roller 36. Lever arm 82 is perpendicular to the levers 76, 78 and substantially longer than such levers 76, 78. Thus, there is a multiplication of the biasing force of weight 84 in an amount corresponding to the effective length of lever arm 82 divided by the length of lever 76 or 78.

If the belt 32 stretches, weight 84 rotates shaft 80 which in turn rotates levers 76, 78 in a counterclockwise direction in FIG. 1. Rotation of levers 76, 78 in a counterclockwise direction in FIG. 1 causes the links 72, 74 to move horizontally to the left in FIG. 1 thereby pivoting the bearing housings 60, 62 in a counterclockwise direction in FIG. 1. As the bearing housings 60, 62 pivot, the roller 36 is moved to the left in FIG. 1. Since the range of adjustment is quite small, such as less than one-half inch, for all practical purposes, during such adjustment the longitudinal axis of the roller 36 moves in a horizontal line. Thus, the tension in belt 32 will be virtually constant regardless of variations in length of the belt 32.

The present invention may be embodied in other specific forms without departing from the spirit or essential attributes thereof and, accordingly, reference should be made to the appended claims, rather than to the foregoing specification as indicating the scope of the invention.

I claim:

1. A constant belt tensioner comprising an endless belt extending around first and second rollers, belt tensioning means connected to one of said rollers for adjusting the tension of said belt, said belt tensioning means including a weight connected to one portion of a lever arm, another portion of said lever arm being fixedly connected to a shaft and being perpendicular thereto, said shaft being located between the runs of said belt and being rotatable about its longitudinal axis which is parallel to said one roller, said belt tensioning means including first and second levers perpendicular to and fixedly connected to said shaft for rotation therewith, said first and second levers being perpendicular to the portion of said lever arm fixedly connected to said shaft, and said first and second levers being substantially shorter than the length of said lever arm.

2. A constant belt tensioner comprising an endless belt extending around first and second rollers, means connected to said first roller for driving said first roller, means connected to said second roller for adjusting the tension of said belt, said belt tensioning means including a weight connected to one portion of a lever arm, another portion of said lever arm being fixedly connected to a shaft and being perpendicular thereto, said shaft being rotatable and having its longitudinal axis parallel to the axis of said second roller, first and second levers perpendicular to and fixedly connected to said shaft, first and second bearing housings having one portion pivotably supported for rotation about an axis parallel to the axis of said shaft, link means pivotably interconnecting a free end portion of each lever with an end portion of each bearing housing, said bearing housings rotatably supporting said second roller intermediate the ends of the bearing housings, the effective length of said levers corresponding to the effective length of said bearing housings.

3. Apparatus in accordance with claim 2 wherein the length of said lever arm is at least twice the length of said levers.

4. Apparatus in accordance with claim 2 wherein said link means includes parallel links spaced apart by a distance greater than the transverse width of the belt.

5. Apparatus in accordance with claim 2 wherein said shaft is longer than the transverse width of said belt and extends between the upper and lower runs of said belt.

* * * * *